(12) United States Patent
Harrison (10) Patent No.: US 12,095,361 B2
(45) Date of Patent: Sep. 17, 2024

(54) ACTIVE ELECTROMAGNETIC INTERFERENCE CANCELLATION CIRCUITS

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

(*) Notice: Subject to any disclaimer, the term of this patent is extended or adjusted under 35 U.S.C. 154(b) by 321 days.

(21) Appl. No.: 17/854,545

(22) Filed: Jun. 30, 2022

(65) Prior Publication Data

US 2023/0015609 A1 Jan. 19, 2023

Related U.S. Application Data

(60) Provisional application No. 63/221,286, filed on Jul. 13, 2021.

(51) Int. Cl.
| | |
|---|---|
| *H02M 1/44* | (2007.01) |
| *H02M 1/00* | (2006.01) |
| *H02M 7/48* | (2007.01) |

(52) U.S. Cl.
CPC .......... *H02M 1/44* (2013.01); *H02M 1/0085* (2021.05); *H02M 7/4815* (2021.05)

(58) Field of Classification Search
CPC ..... H02M 1/44; H02M 7/4815; H02M 1/0085
See application file for complete search history.

(56) References Cited

U.S. PATENT DOCUMENTS

| | | | | |
|---|---|---|---|---|
| 3,963,975 A | * | 6/1976 | Gauper, Jr. | ............. H02M 1/15 336/84 R |
| 9,531,300 B2 | * | 12/2016 | Harrison | ............... H02M 5/297 |
| 9,859,814 B2 | * | 1/2018 | Harrison | ........... H02M 3/33592 |
| 2023/0253878 A1 | * | 8/2023 | Hanson | ................... H02M 1/44 323/282 |

* cited by examiner

*Primary Examiner* — Adolf D Berhane
(74) *Attorney, Agent, or Firm* — Moser Taboada (57) ABSTRACT

Methods and apparatus for active EMI cancellation in a switch mode power supply are provided herein. For example, an apparatus comprises an active EMI cancellation circuit coupled to a switch mode power supply circuit comprising an isolation transformer, wherein the active EMI cancellation circuit is positioned such that current flow through an EMI coupling capacitor substantially matches displacement current flow through a primary-to-secondary interwinding capacitance of the isolation transformer.

20 Claims, 13 Drawing Sheets

ACTIVE ELECTROMAGNETIC INTERFERENCE CANCELLATION CIRCUITS

CROSS-REFERENCE TO RELATED APPLICATIONS

The present application claims the benefit of and priority to U.S. Provisional Application Ser. No. 63/221,286, filed Jul. 13, 2021, the entire contents of which is incorporated herein by reference.

BACKGROUND

Field of the Disclosure

Embodiments of the present disclosure relate generally to in switch mode power supplies, and for example, to active electromagnetic interference (EMI) cancellation circuit for use in switch mode power supplies.

Description of the Related Art

A switch mode power supply (SMPS) is an electronic power supply that utilizes semiconductor switching techniques to provide a required output voltage. SMPSs provide greater efficiency than linear regulators, are generally small in size, and are widely used in computers and other sensitive electronic equipment.

In order for an SMPS to utilize smaller components, the SMPS must operate at higher switching frequencies. Increasing the SMPS switching frequency, however, results in increased transformer displacement currents, which are the fundamental mechanism for creating electromagnetic interference (EMI) in the SMPS. In addition, while the use of planar transformers in SMPSs offers advantages over the use of conventional transformers, such as low profile and high-power densities, they result in much greater transformer displacement currents.

Conventional techniques for mitigating transformer displacement currents include passive EMI cancellation of transformer displacement currents and active EMI cancellation of transformer displacement currents. With passive EMI cancellation, careful design analysis of an SMPS can identify a source of any transformer displacement currents and lead to a passive cancellation design. For example, the passive cancellation design aims to create a displacement current return path that is deliberately kept as close to the transformer with a view of minimizing the physical size of the loop that the displacement currents flow. Accordingly, an effectiveness of the passive solution, however, is limited.

Active EMI cancellation uses an amplifier as an active circuit. Rather than trying to engineer a solution around identifying the source of EMI in an SMPS, such a generic approach aims to directly measure the EMI being generated to create an equal and opposite signal to cancel the EMI. Accordingly, an effectiveness of the active (generic) solution, however, is also limited.

Therefore, the inventors have provided herein improved methods and apparatus using active EMI cancellation circuitry specifically targeted at a source of the EMI being generated.

SUMMARY

In accordance with at least aspects of the disclosure, an apparatus for active EMI cancellation in a switch mode power supply comprises an active EMI cancellation circuit coupled to a switch mode power supply circuit comprising an isolation transformer, wherein the active EMI cancellation circuit is positioned such that current flow through an EMI coupling capacitor substantially matches displacement current flow through a primary-to-secondary interwinding capacitance of the isolation transformer.

In accordance with at least aspects of the disclosure, a single-phase switched mode power supply comprises a DC side comprising a first plurality of switches and a DC component, an AC side comprising a second plurality of switches and connected to an AC line, an active EMI cancellation circuit coupled to a switched mode power supply circuit comprising an isolation transformer, wherein the active EMI cancellation circuit is positioned such that current flow through an EMI coupling capacitor substantially matches displacement current flow through a primary-to-secondary interwinding capacitance of the isolation transformer, and a controller coupled to the active EMI cancellation for controlling operation of the first plurality of switches and the second plurality of switches to generate a differential mode voltage across the isolation transformer such that a voltage applied across ends of a primary winding of the isolation transformer generates a corresponding voltage across ends of a secondary winding of the isolation transformer to achieve power conversion from the DC component to the AC line or vice versa.

In accordance with at least aspects of the disclosure, a method of controlling a single-phase switched mode power supply comprises operating the single-phase switched mode power supply and controlling a first plurality of switches and a second plurality of switches of an active EMI cancellation circuit positioned such that current flow through an EMI coupling capacitor substantially matches displacement current flow through a primary-to-secondary interwinding capacitance of an isolation transformer of a switched mode power supply circuit to generate a differential mode voltage across the isolation transformer such that a voltage applied across ends of a primary winding of the isolation transformer generates a corresponding voltage across ends of a secondary winding of the isolation transformer to achieve power conversion from a DC component of the single-phase switched mode power supply to an AC line of the single-phase switched mode power supply or vice versa.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure generally relate to an active electromagnetic interference (EMI) cancellation circuit for switched mode power supplies (SMPS). In some embodiments, such as for use in a single-phase SMPS as described below, the active EMI cancellation circuit comprises two small autotransformers (a primary autotransformer and a secondary autotransformer) and two small capacitors (a blocking capacitor and a coupling capacitor). In one or more other embodiments, a single 3-limb transformer can be used in place of the two autotransformers. The number of turns for each autotransformer is determined based on peak flux density considerations and requirements to provide the correct magnitude of the transformer displacement current cancellation current that will flow through the EMI coupling capacitor. For example, the EMI coupling capacitor can be (nominally) chosen to equal the primary-to-secondary interwinding capacitance that is present in the isolation transformer of the SMPS. The value of the blocking capacitor is chosen so that the value of the blocking capacitor is much larger than avalue of the EMI coupling capacitor.

The two individual autotransformers (or single 3-limb transformer) in the active EMI cancellation circuit can be extremely small transformers as the actual power the two individual autotransformers need to process can be minute compared to the power processed through the main isolation transformer of the SMPS. The autotransformers can be located in close proximity to the main isolation transformer and may be constructed using a conventional 'magnet wire' winding design or, alternatively, they may be implemented as small planar transformer designs.

Although the active EMI cancellation circuit is described below with respect to use in a single-phase SMPS, the configuration of the active EMI cancellation circuit may be engineered to work with other SMPS topologies. For example, the active EMI cancellation circuit may be engineered by analyzing a source of any transformer displacement currents and deriving an appropriate cancellation circuit to mitigate the EMI resulting from these displacement currents. To apply this concept to an SMPS, the specific details of the primary and secondary switch modulation schemes can be considered along with the isolation transformer construction design. One skilled in the art should be able to derive the specific design details required to be able to apply this design concept to any types of SMPS.

Figure 1:
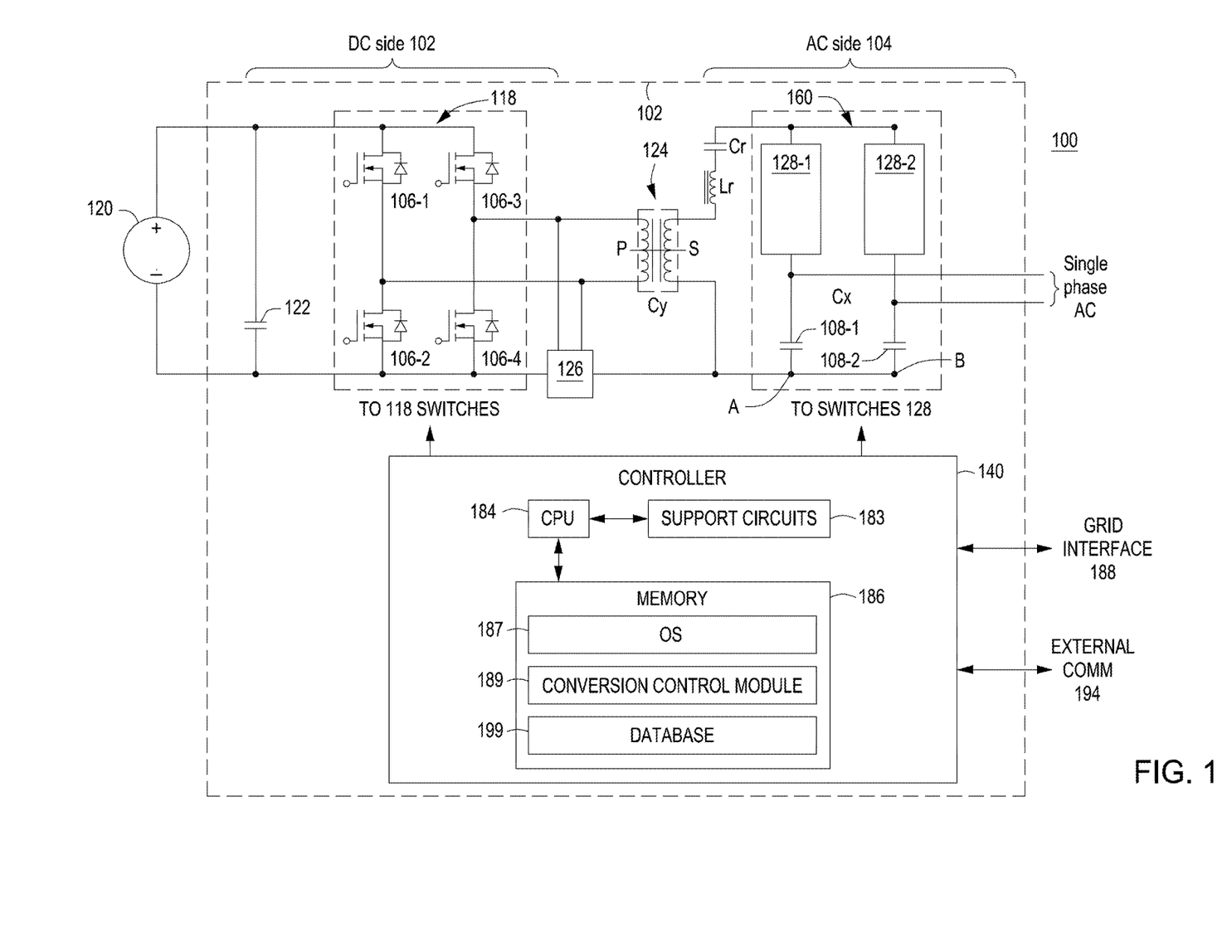
FIG. 1 is a block diagram of a single-phase switched mode power supply (SMPS) in accordance with embodiments of the present disclosure.

FIG. 1 is a block diagram of a single-phase SMPS 100 (switched mode power supply) in accordance with embodiments of the present disclosure. The SMPS 100 is a single-phase bidirectional DC-AC resonant converter comprising a DC side 102 and an AC side 104 coupled via an isolation transformer 124. The SMPS 100 further comprises a controller 140 for operably controlling power conversion by the SMPS 100. One or more additional components not shown may be coupled to the SMPS 100 for enabling the power conversion, such as voltage and/or current monitors which measure voltage and/or current at various points and coupled the measured data to the controller 140.

The DC side 102 comprises a capacitor 122 coupled across both an input bridge 118 and a primary winding P of the isolation transformer 124. The input bridge 118 comprises multiple switches 106-1, 106-2, 106-3, and 106-4 (e.g., MOSFETS) configured as a full H-bridge, although in other embodiments the input bridge 118 may be a half bridge. The input bridge 118 is coupled across a DC component 120, such as one or more renewable energy sources (e.g., photovoltaic (PV) modules, wind farms, hydroelectric systems, or the like), batteries, fuel cells, or any suitable DC component which can provide and/or receive DC power.

The AC side 104 comprises the secondary winding S of the isolation transformer 124 coupled in series with an inductor Lr and a capacitor Cr. The series combination is coupled across a cycloconverter 160 that is further coupled to a single-phase AC line. The cycloconverter 160 comprises two four-quadrant (4Q) fully bidirectional switches 128-1 and 128-2 (collectively referred to as 4Q switches 128). The 4Q switches 128-1 and 128-2 are coupled to capacitors 108-1 and 108-2, respectively, to form respective first and second legs A and B. The first and second legs A and B are coupled in parallel, with a first AC line terminal coupled between the 4Q switch 128-1 and the capacitor 108-1, and a second AC line terminal coupled between the 4Q switch 128-2 and the capacitor 108-2. As depicted in FIG. 1, the cycloconverter 160 is a half-bridge cycloconverter; in some other embodiments, a full-bridge cycloconverter may be alternatively used.

The 4Q switches 128-1 and 128-2 are each fully-controlled native 4Q bidirectional switches, for example gallium nitride (GaN) high mobility electron transistor (HEMT) switches built as native 4Q switch devices. Examples of the such native 4Q switches may be found in commonly assigned U.S. Patent Application No. 63/214,260, titled "Gallium Nitride Bi-directional High Electron Mobility Transistor in Switched Mode Power Converter Applications", which is herein incorporated by reference in its entirety. In some other embodiments, the 4Q switches may be any other suitable structure that acts as a 4Q switches, such as two source-connected metal—oxide—semiconductor field-effect transistor (MOSFET) switches.

The AC side 104 comprises an individual resonant inductor Lr coupled in series with a single resonant capacitor Cr, and this series combination is further coupled in series with the end of the isolation transformer secondary winding S that is coupled to the 4Q switches 128. Additionally, a 'virtual neutral' point is created by splitting the 'X-capacitor' in the EMC filter into two capacitors (Cx)—this 'virtual neutral' point is connected to the other end of the secondary winding S of the isolation transformer 124.

An active EMI cancellation circuit 126 is coupled across the primary winding P, between the switches 106-2 and 106-4, and between the secondary winding S and the capacitor 108-1.

The controller 140 is communicatively coupled to the input bridge switches 106-1, 106-2, 106-3, and 106-4, collectively referred to as switches 106, and the 4Q switches 128 for operatively controlling the switches to generate the desired output power.

The controller 140 comprises a CPU 184 coupled to each of support circuits 183 and a memory 186. The CPU 184 may comprise one or more conventionally available microprocessors or microcontrollers; additionally or alternatively, the CPU 184 may include one or more application specific integrated circuits (ASICs). The support circuits 183 are well known circuits used to promote functionality of the CPU 184. Such circuits include, but are not limited to, a cache, power supplies, clock circuits, buses, input/output (I/O) circuits, and the like. The controller 140 may be implemented using a general purpose computer that, when executing particular software, becomes a specific purpose computer for performing various embodiments of the present disclosure.

The memory 186 is one or more non-transitory storage media comprising read only memory, random access memory, or a combination thereof for storing software and data. In one embodiment, the software comprises an OS 187 (operating system), if necessary, of the controller 140 that can be supported by the CPU capabilities. In some embodiments, the OS 187 may be one of a number of commercially available operating systems such as, but not limited to, LINUX, Real-Time Operating System (RTOS), and the like.

The memory 186 may store various forms of application software, such as a conversion control module 189 for controlling power conversion by the SMPS 100, for example maximum power point tracking (MPPT), switching, and the like. The memory 186 may further store a database 199 for storing various data. The controller 140 further processes inputs and outputs to external communications 194 (e.g., gateway) and a grid interface 188.

During operation of the SMPS 100, each of the switches 106 and 128 are activated and deactivated by the controller 140, according to the conversion control module 189, to achieve power conversion from the DC component 120 to the AC line (and/or vice versa). For the purpose of power conversion, the switches 106 and 128 are controlled to generate a differential mode voltage across the isolation transformer 124—e.g., a voltage applied across the ends of primary winding P will generate a corresponding voltage to be generated across the ends of the secondary winding S.

A consequence of this switching action is that, in addition to the desired differential mode voltage, a common mode voltage is generated across the primary P to secondary S of the isolation transformer 124. This common mode voltage serves no useful purpose in regard to power conversion and is directly responsible for generating undesirable transformer displacement currents which will flow from the primary P to the secondary S via the primary-to-secondary interwinding capacitance that results from the physical proximity of the primary winding P and the secondary winding S. For the specifics of the isolation transformer design in various embodiments, this primary-to-secondary interwinding capacitance can be modeled by one skilled in the art as a single equivalent lumped capacitor Cy connected from a specific point on the primary winding P to a specific point on the secondary winding S.

In one or more embodiments where the isolation transformer 124 has a planar transformer structure, the entire surface area of the primary winding P is physically located such that it covers the entire surface area of the secondary winding S; this configuration results in the interwinding capacitance being evenly distributed over the entire area of the primary and secondary windings P and S, resulting in an equivalent lumped capacitance Cy connected from the mid-point of the primary winding P to the mid-point of the secondary winding S, as depicted by the horizontal line cross the primary winding P and the secondary winding S in FIG. 1. In some embodiments, other winding configurations for the isolation transformer 124 may differ from this design—for example, a multi-layered design might result in only part of the primary winding area covering part of the secondary winding area.

The arrangement of the power components Lr, Cr and Cx is required to ensure that the common mode voltage generated across the primary P to secondary S windings of the isolation transformer 124 is reduced to a simple waveform that can be fed into the active EMI cancellation circuit 126. In other embodiments where an SMPS has a topology different from the SMPS 100, one skilled in the art would be able to design the required circuit rearrangement needed to make the SMPS compatible with the active EMI cancellation circuit 126.

Figure 2:
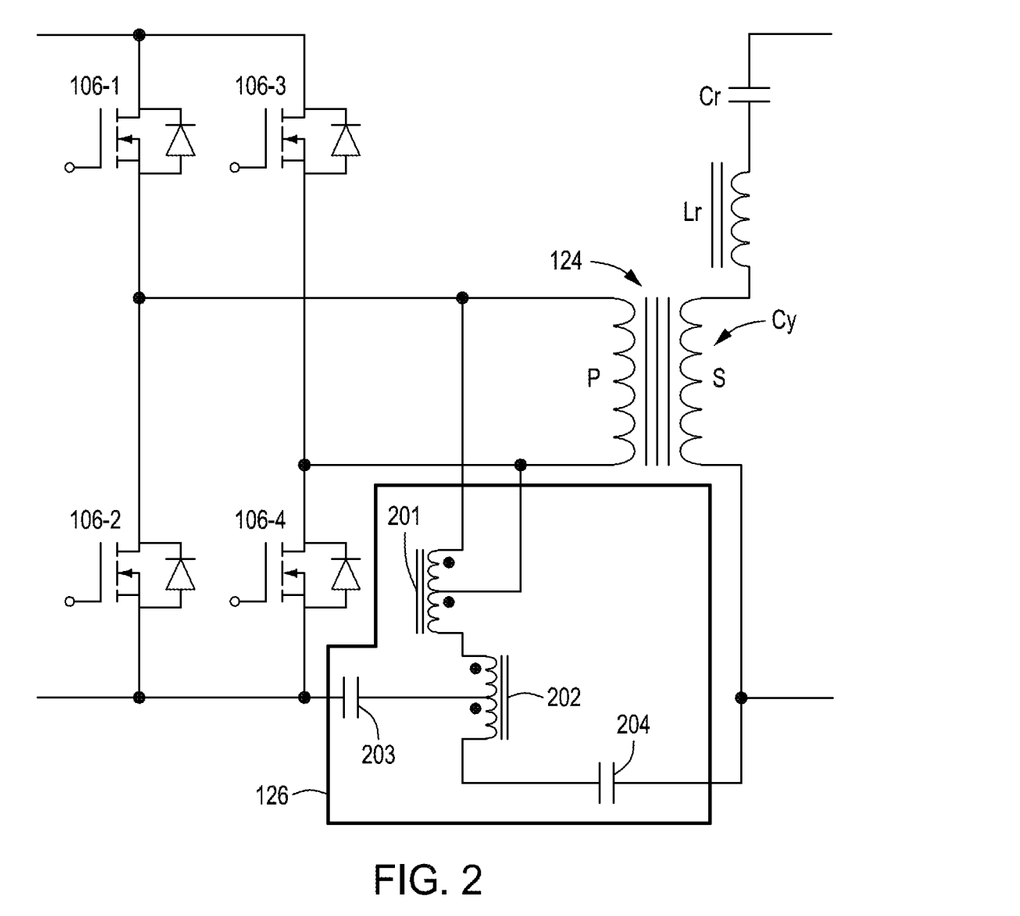
FIG. 2 is a schematic diagram of an active EMI cancellation circuit in accordance with embodiments of the present disclosure.

FIG. 2 is a schematic diagram of the active EMI cancellation circuit 126 in accordance with embodiments of the present disclosure. The active EMI cancellation circuit 126 comprises two autotransformers (e.g., a primary autotransformer 201 and a secondary autotransformer 202) and two small capacitors (e.g., a blocking capacitor 203 and an EMI coupling capacitor 204).

The number of turns for each of the primary autotransformer 201 and the secondary autotransformer 202 is selected based on peak flux density considerations and the requirements to provide the correct magnitude of the transformer displacement current cancellation current that will flow through the EMI coupling capacitor 204. The value of the EMI coupling capacitor 204 is (nominally) chosen to equal the primary-to-secondary interwinding capacitance Cy that is present in the isolation transformer 124. The value of the blocking capacitor 203 is selected so that it is much larger than the value of the EMI coupling capacitor 204.

In other embodiments, other configurations of the active EMI cancellation circuit 126 may be derived to work with other types of SMPS converters. For example, different numbers of the blocking capacitor 203 and/or the EMI coupling capacitor 204 may be used, and/or different transformer configurations may be used (e.g., a single 3-limb transformer may be used in place of the two autotransformers).

FIGS. 3A-3H depict a series of waveforms 300 produced during operation of the SMPS 100 in accordance with embodiments of the present disclosure. The series of waveforms 300 relate to the operation of the active EMI cancellation circuit 126 in one or more embodiments.

The series of waveforms 300 comprises waveforms 304-1, 304-2, 304-3, 304-4, 304-5, 304-6, 304-7, and 304-8, which may be collectively referred to as "waveforms 304". For each of the waveforms 304, a depiction of the SMPS 100 is shown with a corresponding indicator (i.e., arrows 302-1, 302-2, 302-3, 302-4, 302-5, 302-6, 302-7, and 302-8) identifying the location within the SMPS 100 across which the corresponding waveforms is present.

The configuration of the DC side 102 (i.e., the primary side) of the SMPS 100 is that of a phase-shift modulated full-bridge which can assume four different bridge switch states: 1) OFF+=Top-Left & Top-Right MOSFETs 106 are ON, Bottom-Left & Bottom-Right MOSFETs 106 are OFF; 2) ON−=Top-Right & Bottom-Left MOSFETs 106 are ON, Top-Left & Bottom-Right MOSFETs 106 are OFF; 3) OFF−=Bottom-Left & Bottom-Right MOSFETs 106 are ON, Top-Left & Top-Right MOSFETs 106 are OFF; and 4)

ON+=Top-Left & Bottom-Right MOSFETs 106 are ON, Top-Right & Bottom-Left MOSFETs 106 are OFF.

Figure 3A:
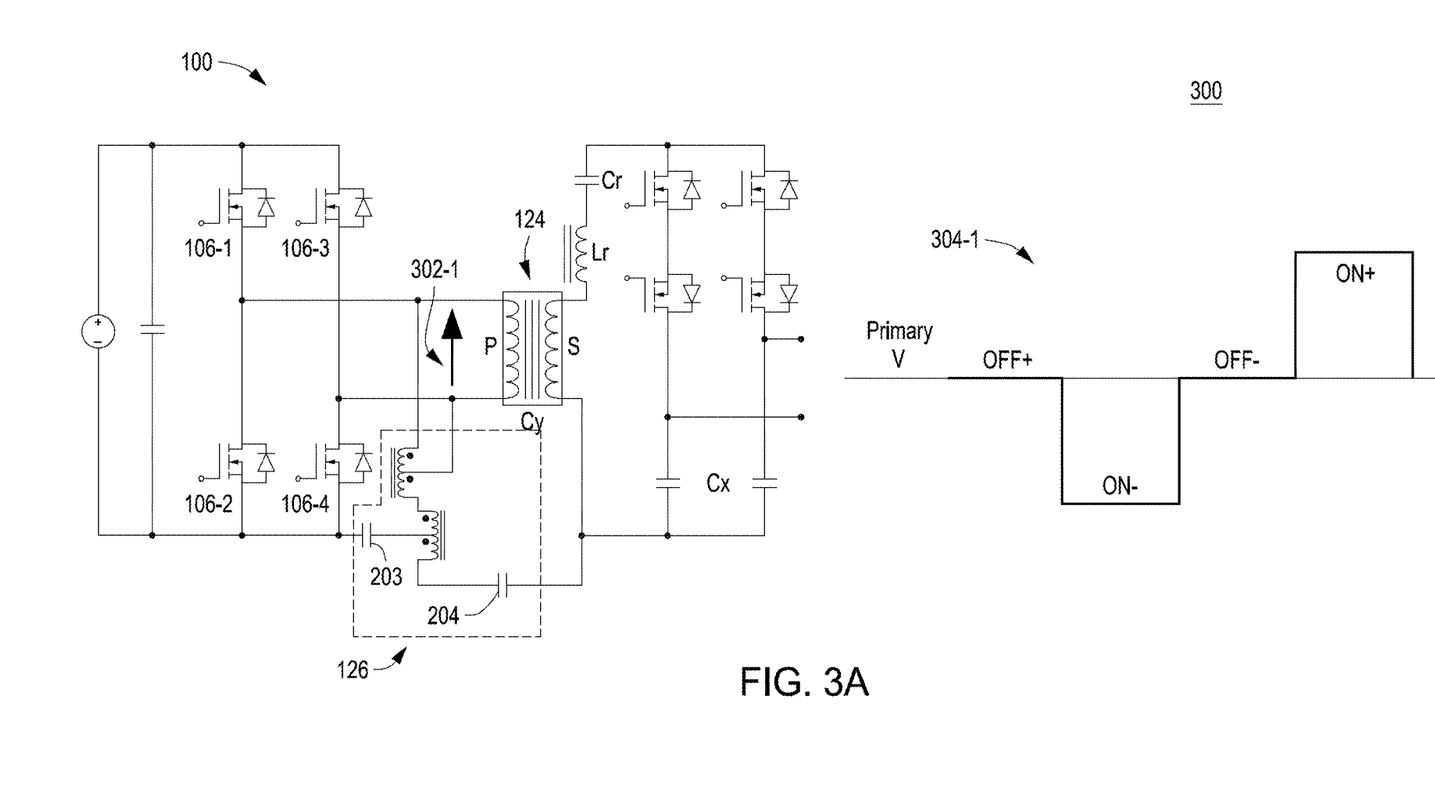
FIGS. 3A-3H are schematic diagrams of an active EMI cancellation circuit and a corresponding series of waveforms produced during operation of the SMPS in accordance with embodiments of the present disclosure.

During operation, the switching modulation scheme (implemented by the controller 140) repeatedly cycles through the four states in the order shown (continually). The waveform 304-1 depicts the resulting primary waveform that is applied to the isolation transformer 124, shown by the arrow 302-1, and is also applied to the primary autotransformer 201 of the active EMI cancellation circuit 126 (FIG. 3A).

Figure 3B:
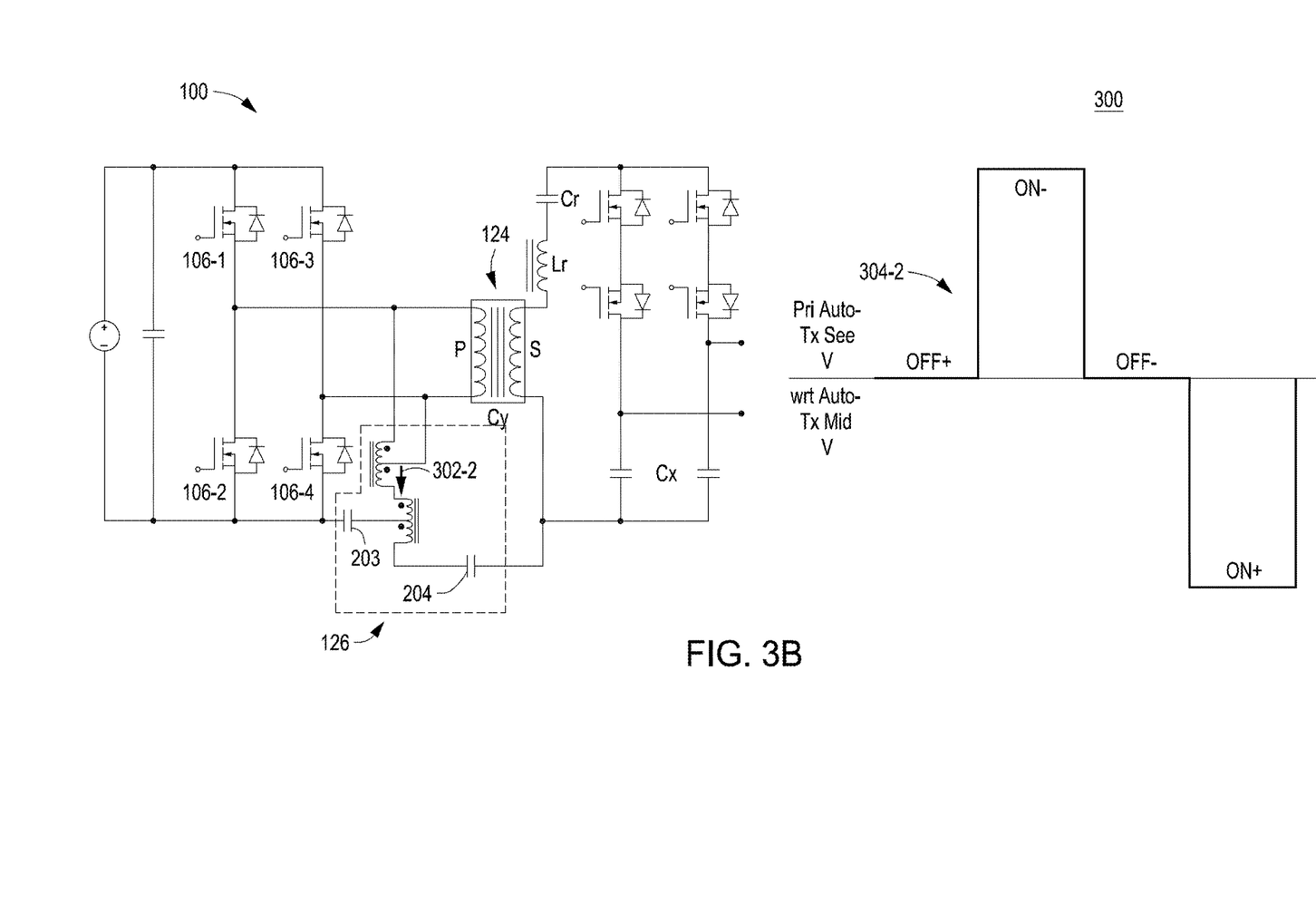

The primary autotransformer 201 inverts the voltage applied to the primary winding P of the isolation transformer 124 and scales the waveform according to the primary-to-secondary turns ratio of the isolation transformer 124 (main transformer), resulting in the waveform 304-2 at the location shown by the arrow 302-2 (FIG. 3B).

Figure 3C:
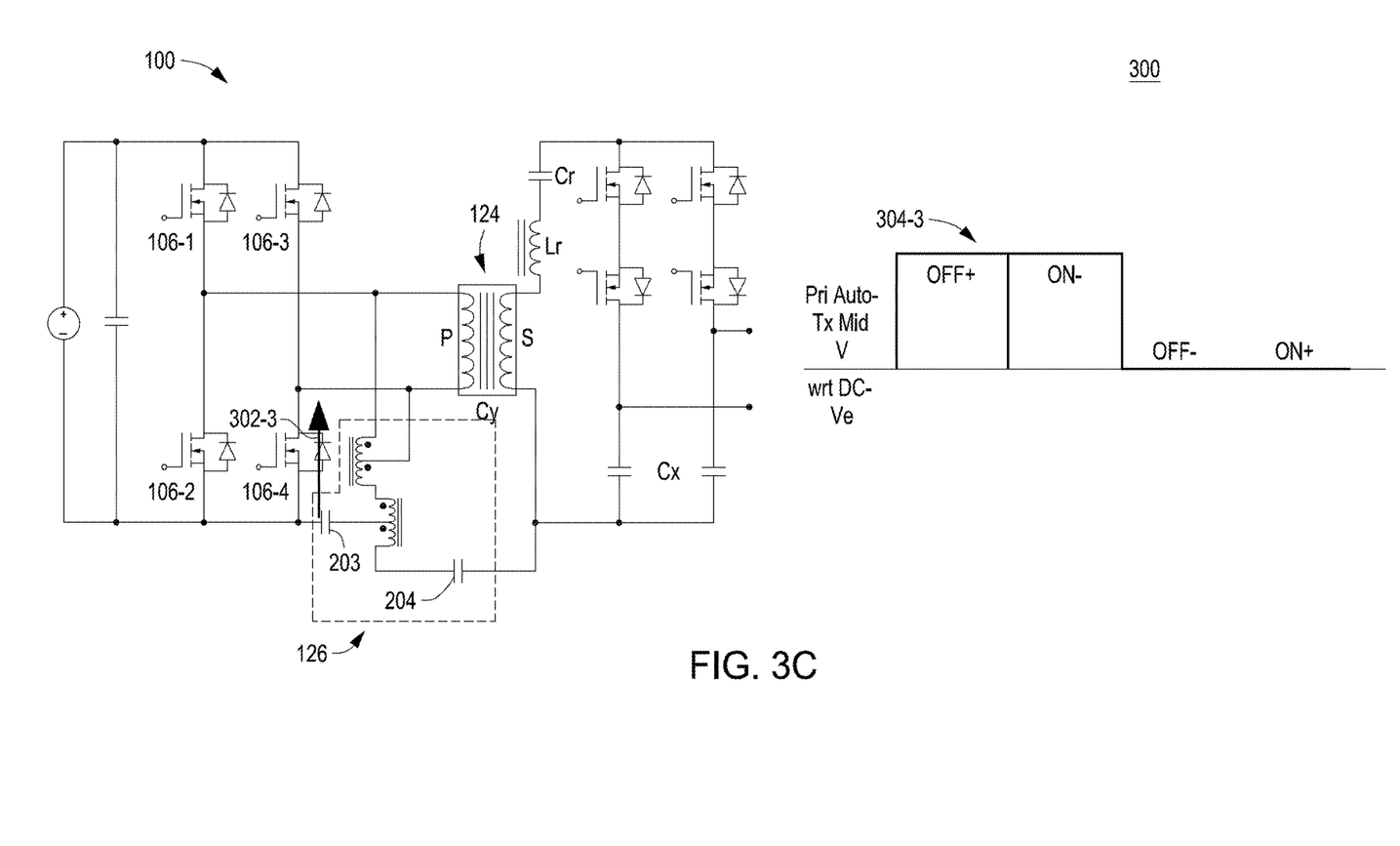

The phase shift modulation scheme results in each end of the isolation transformer winding being connected to the negative end of the DC input for 50% of the time, and connected to the positive end of the DC input the remaining 50% of the time, as shown by the waveform 304-3 at the location shown by the arrow 302-3 (FIG. 3C).

Figure 3D:
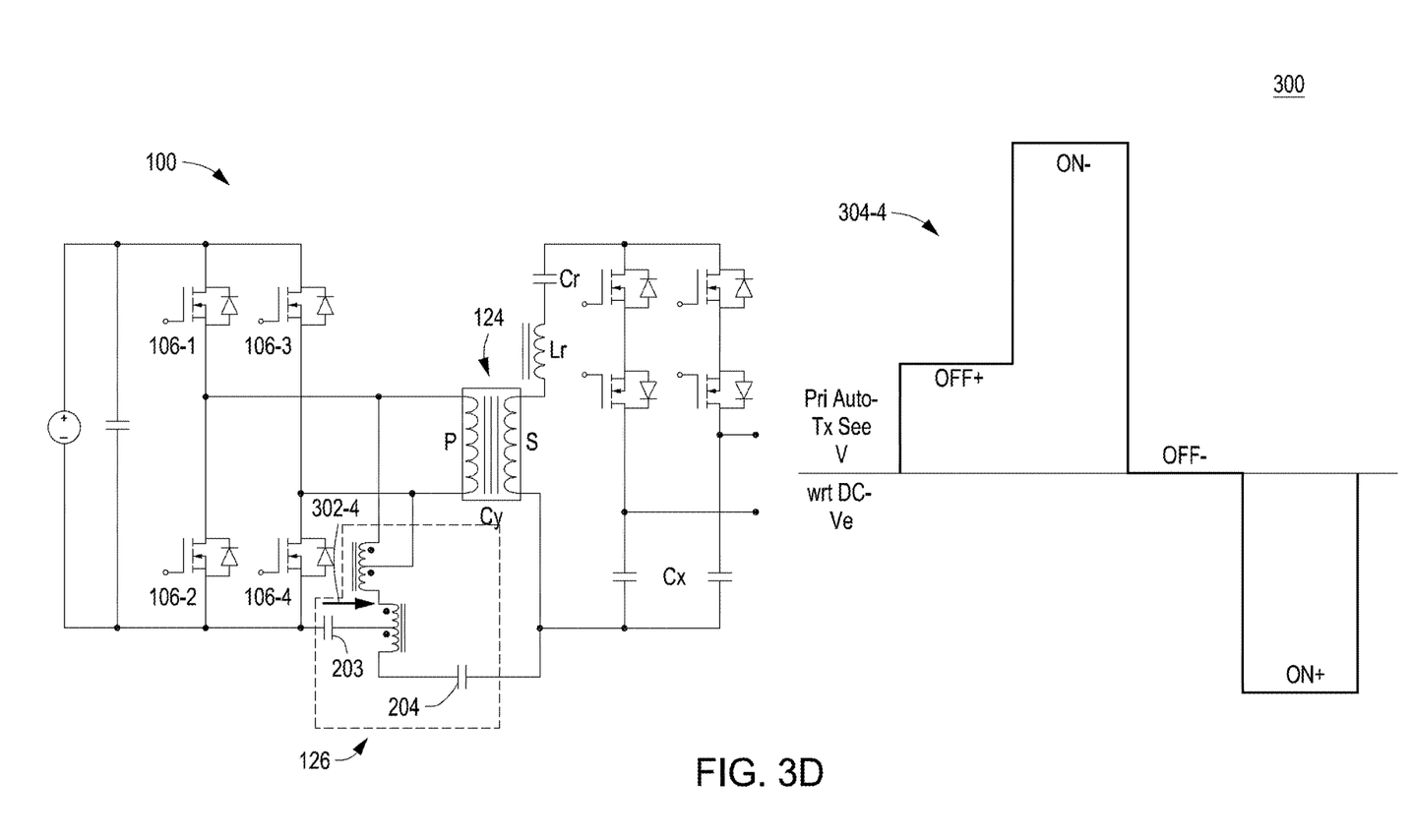

Adding the waveforms 304-2 and 304-3 results in the waveform 304-4 that exists between the negative end of the DC input and the input of the secondary autotransformer, shown by the arrow 302-4 (FIG. 3D).

Figure 3E:
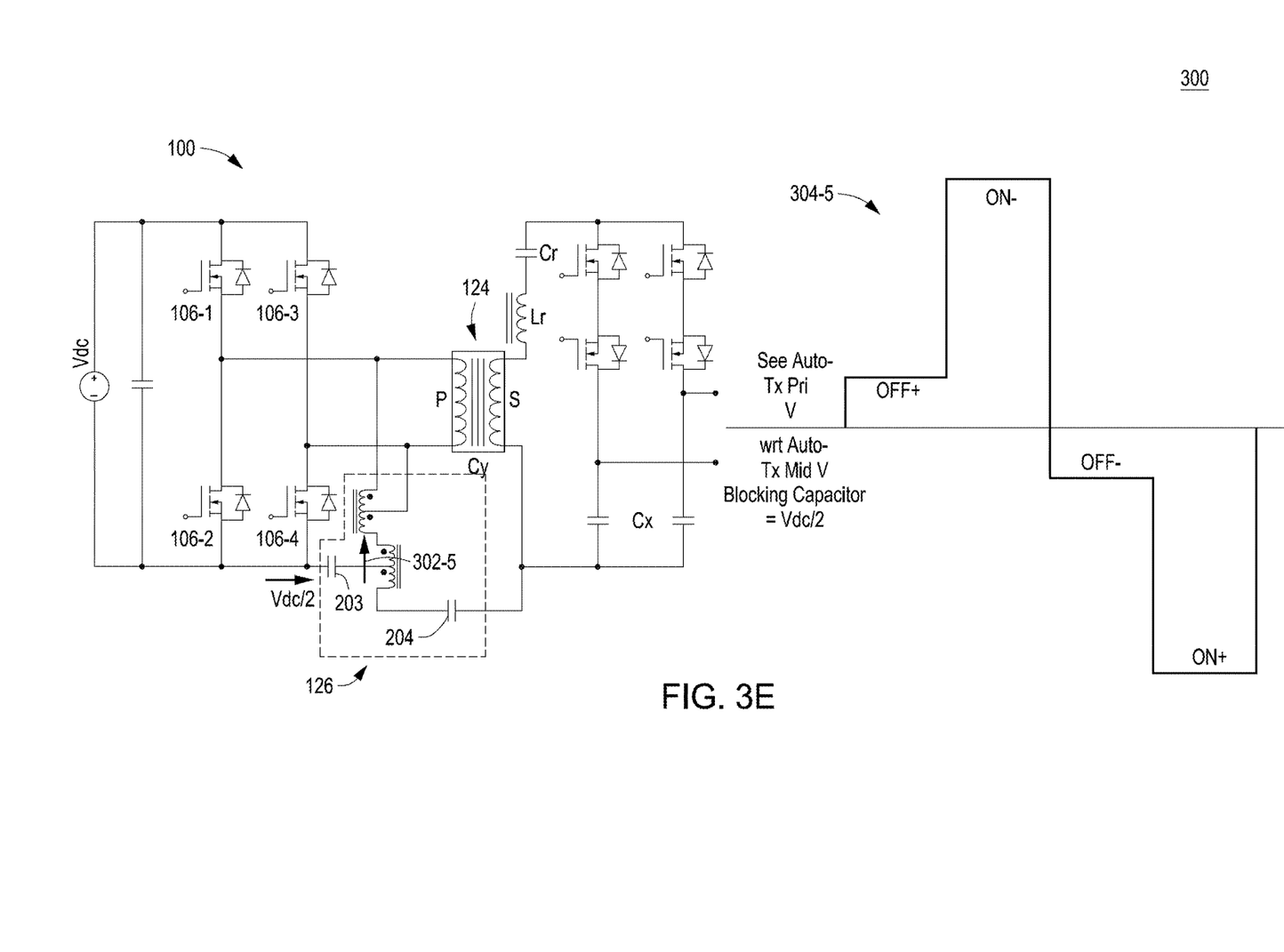

The phase shift modulation scheme results in each end of the isolation transformer winding being connected to the negative end of the DC input for 50% of the time and connected to the positive end of the DC input the remaining 50% of the time. This in turn will result in a DC voltage being established across the blocking capacitor 203 which will be equal in magnitude to half of the DC input voltage—e.g., Vdc/2. Taking into consideration this voltage generated across the blocking capacitor 203, the voltage applied to the secondary autotransformer 202, depicted by the arrow 302-5, can be derived and is shown as the waveform 304-5 (FIG. 3E).

Figure 3F:
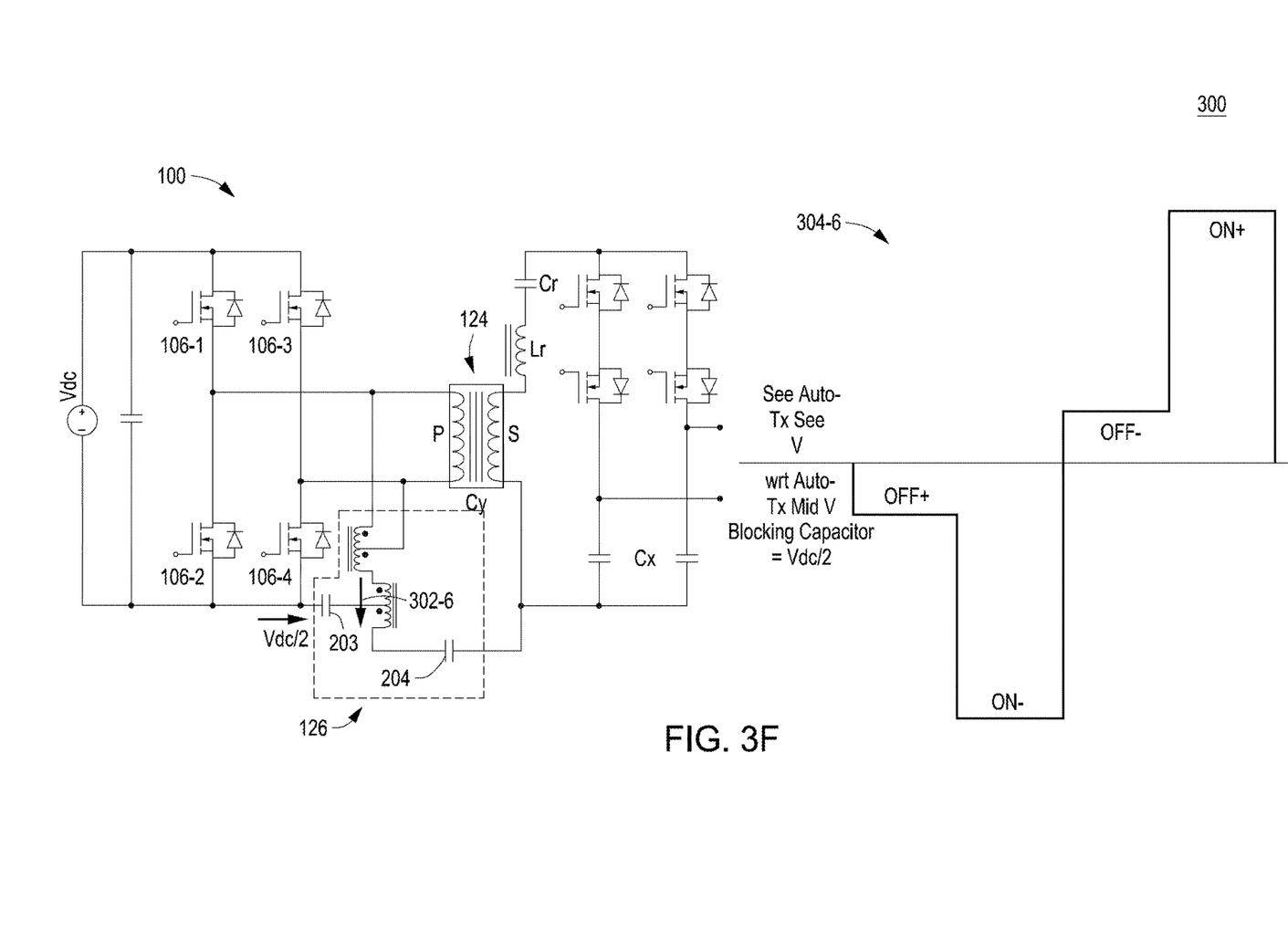
Figure 3G:
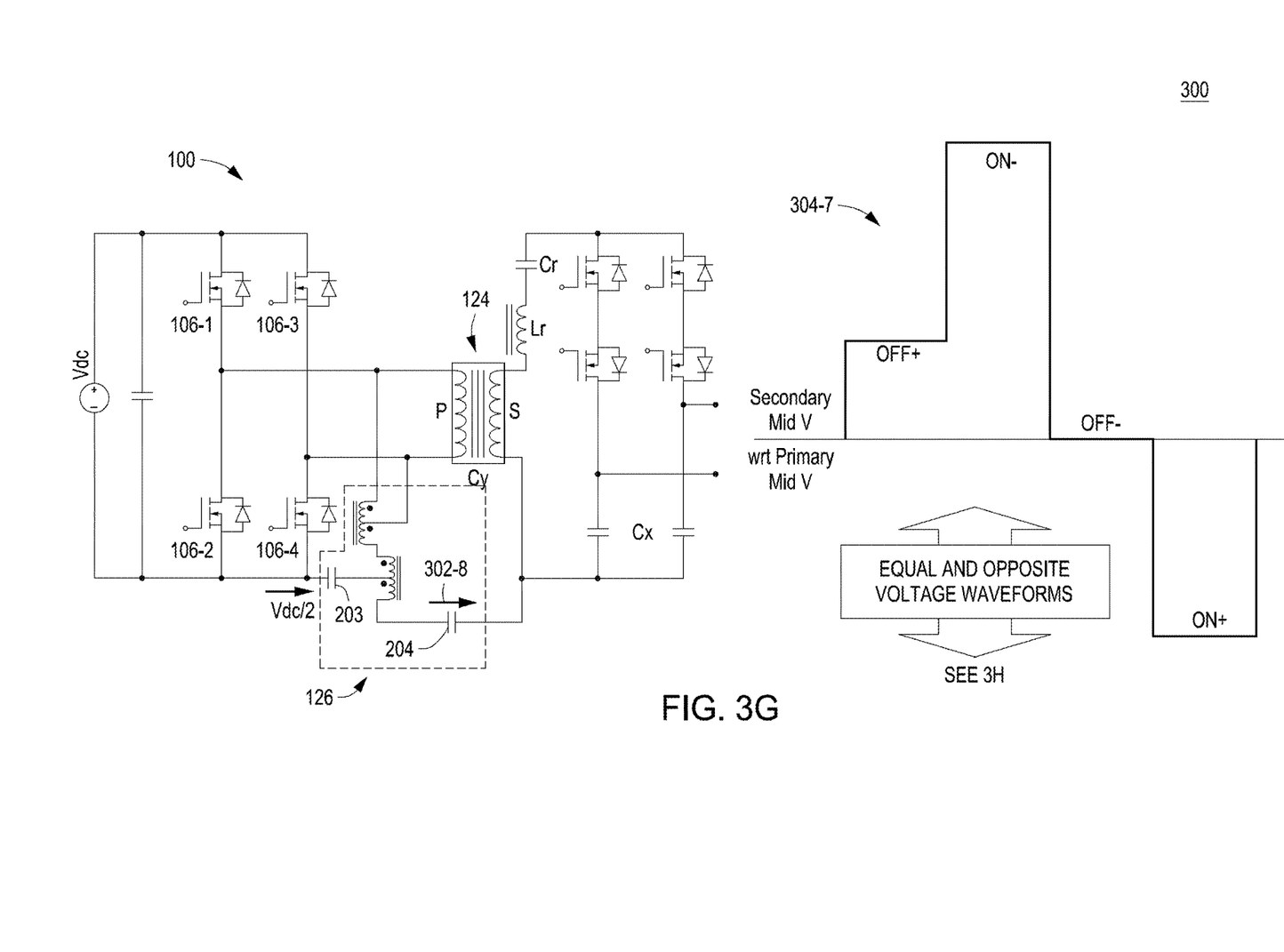
Figure 3H:
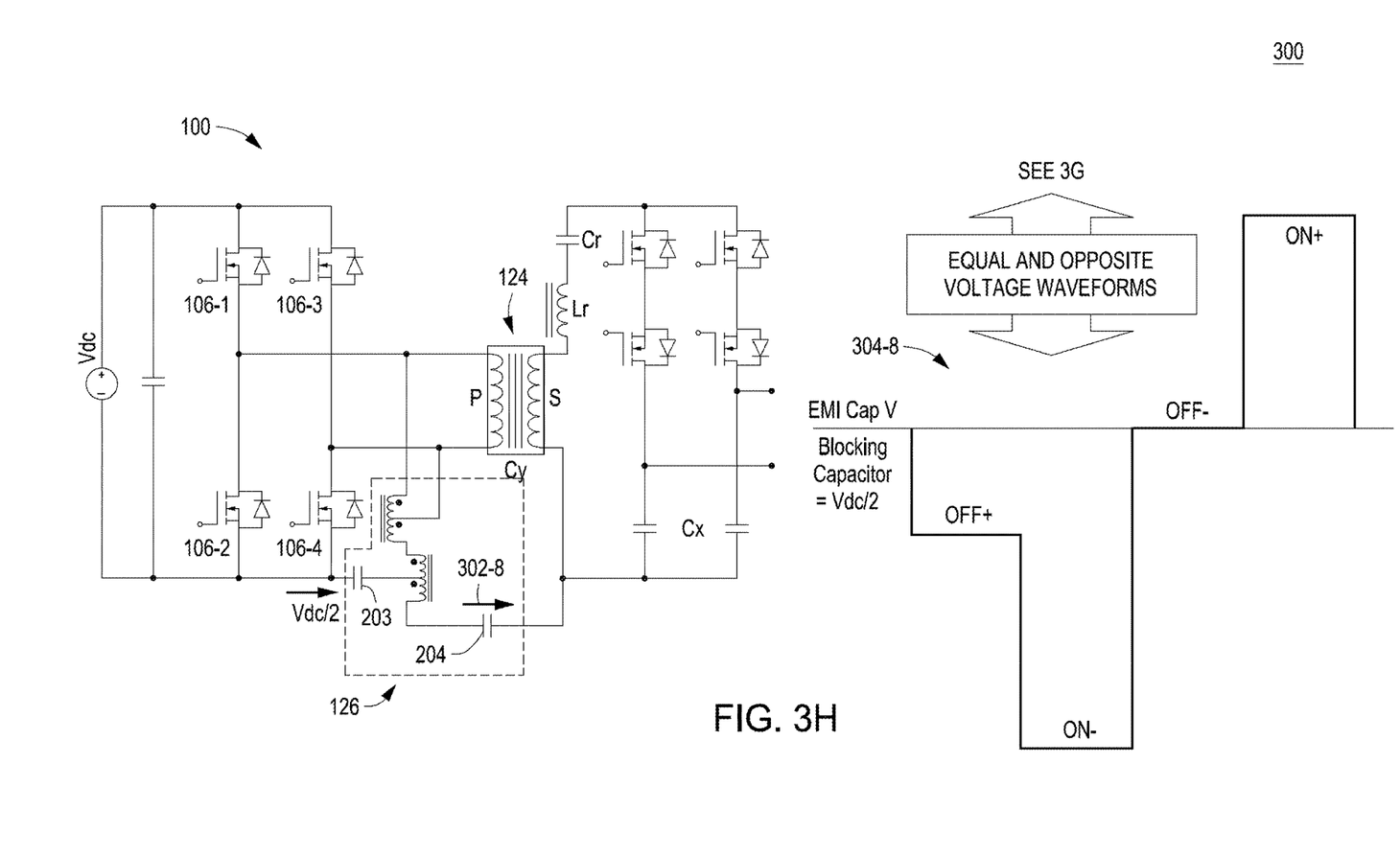

The secondary autotransformer 202 inverts this signal to result in the waveform 304-6 and the location shown by the arrow 302-6 (FIG. 3F).

Based on all the analysis described above with respect to FIGS. 3A-3F, the common mode voltage being generated across the primary-to-secondary of the isolation transformer 124 (the waveform 304-7 (FIG. 3G) at the location shown by the arrow 302-7) is equal and opposite to the voltage being generated across the EMI coupling capacitor 204 (the waveform 304-8 (FIG. 3H) at the location shown by the arrow 302-8). As a result of the EMI coupling capacitor 204 being selected to have a value (nominally) equal to the primary-to-secondary interwinding capacitance Cy of the isolation transformer 124, the current that flows through the EMI coupling capacitor 204 will substantially match the displacement current that flows through the primary-to-secondary interwinding capacitance Cy of the isolation transformer 124. For example, in at least some embodiments, the current that flows through the EMI coupling capacitor 204 can be within +/−10% of the displacement current that flows through the primary-to-secondary interwinding capacitance Cy of the isolation transformer 124. Thus, in at least some embodiments, matching the currents can completely cancel out the transformer displacement current and, thereby, eliminate the need for this displacement current to be filtered out by an EMC filter.

Figure 4:
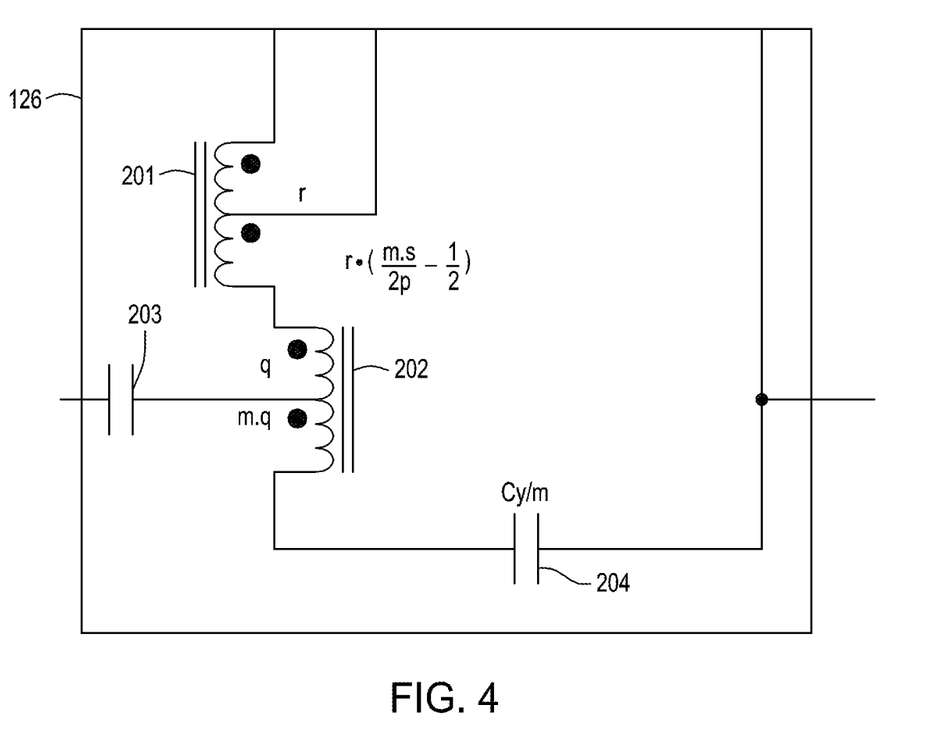
FIG. 4 is a schematic diagram of design considerations for an active EMI cancellation circuit in accordance with embodiments of the present disclosure.

FIG. 4 is a schematic diagram illustrating design considerations for the active EMI cancellation circuit 126 in accordance with embodiments of the present disclosure. The embodiment of the active EMI cancellation circuit 126 shown in FIG. 4 is the same as the embodiment shown in FIG. 2.

As previously described, the primary autotransformer winding configuration of the active EMI cancellation circuit 126 requires the number of turns being chosen to match the primary-to-secondary turns ratio for the isolation transformer 124. In addition, the number of turns on the autotransformers must be chosen to achieve a desired maximum flux density—the number of turns r for the primary autotransformer 201 and number of turns q for the secondary autotransformer 202 are illustrated in the schematic of FIG. 4. It is desirable to incorporate the design freedom that will allow an EMI coupling capacitor value to be chosen that is different to the primary-to-secondary interwinding capacitance Cy for the isolation transformer 124 (i.e., the nominal value). The scale factor m shown in FIG. 4 allows for the scaling of the EMI coupling capacitor 204. Combining all these design considerations together leads to the culmination of the indicated design details in the circuit schematic shown in FIG. 4, where: Cy=EMI Coupling Capacitor, m=EMI Coupling Capacitor scaling factor, p=Number of primary winding turns on the isolation transformer, q=Secondary autotransformer turns required to achieve desired transformer core peak flux density, r=Primary autotransformer turns required to achieve desired transformer core peak flux density, and s=Number of secondary winding turns on the isolation transformer.

Figure 5:
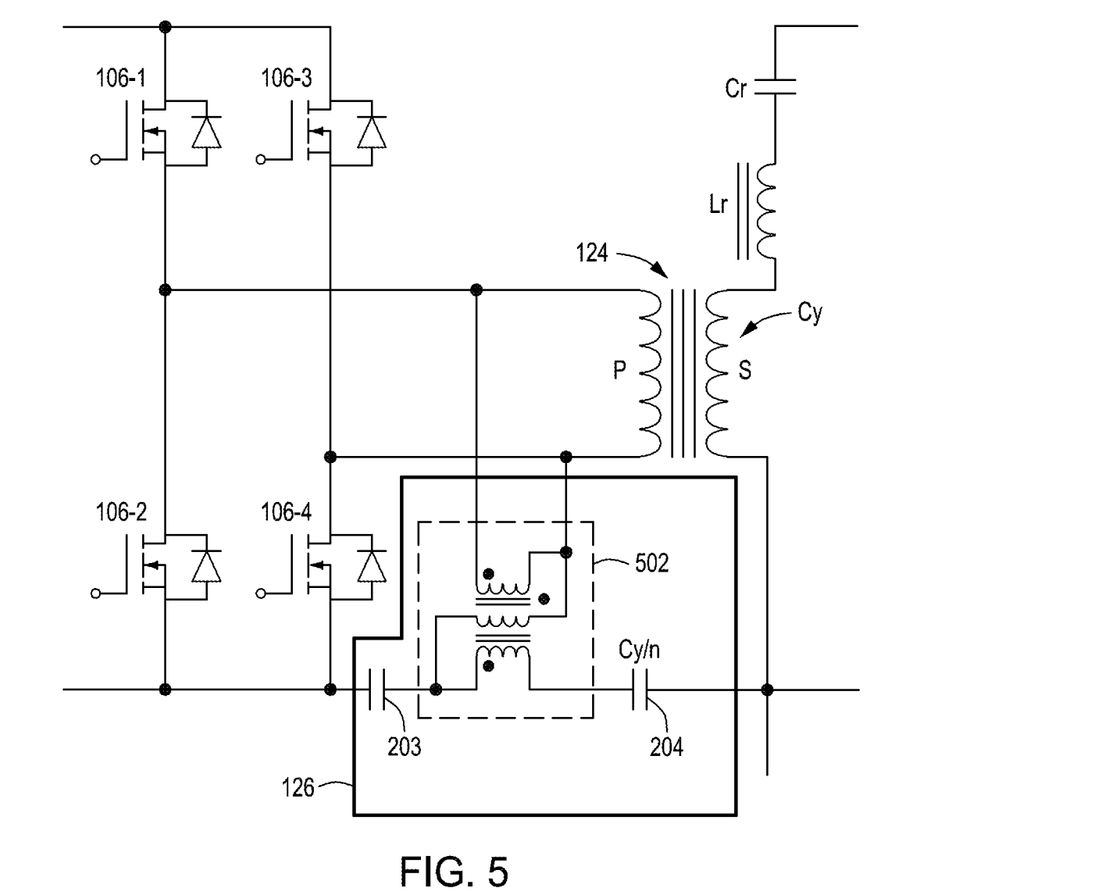
FIG. 5 is a schematic diagram of an active EMI cancellation circuit in accordance with one or more other embodiments of the present disclosure.

FIG. 5 is a schematic diagram of an active EMI cancellation circuit 126 in accordance with one or more other embodiments of the present disclosure. In the embodiment shown in FIG. 5, the autotransformers have been replaced with a 3-limb transformer 502. The transformer design parameters described above (m, p, q, r, & s) must be used to derive the number of windings for the three individual limbs on the 3-limb transformer 502. One skilled in the art would be able to determine this design detail.

Figure 6:
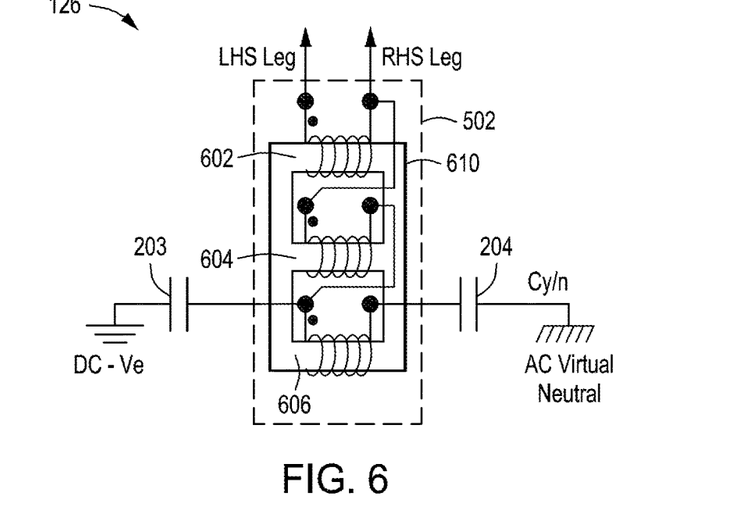
FIG. 6 shows a drawing of the 3-limb transformer in the active EMI cancellation circuit of FIG. 5 in accordance with embodiments of the present disclosure.

FIG. 6 shows a drawing of the 3-limb transformer 502 in the active EMI cancellation circuit 126 of FIG. 5 in accordance with embodiments of the present disclosure. The 3-limb transformer 502 comprises a core 610 having limbs 602, 604, and 606. Windings 612, 614, and 616 are wound on the limbs 602, 604, and 606, respectively, and connected as shown in FIG. 6. Using the transformer design parameters described above (m, p, q, r, and s), one skilled in the art would be able to determine the design detail of the number of windings for the limbs 602, 604, and 606.

Figure 7:
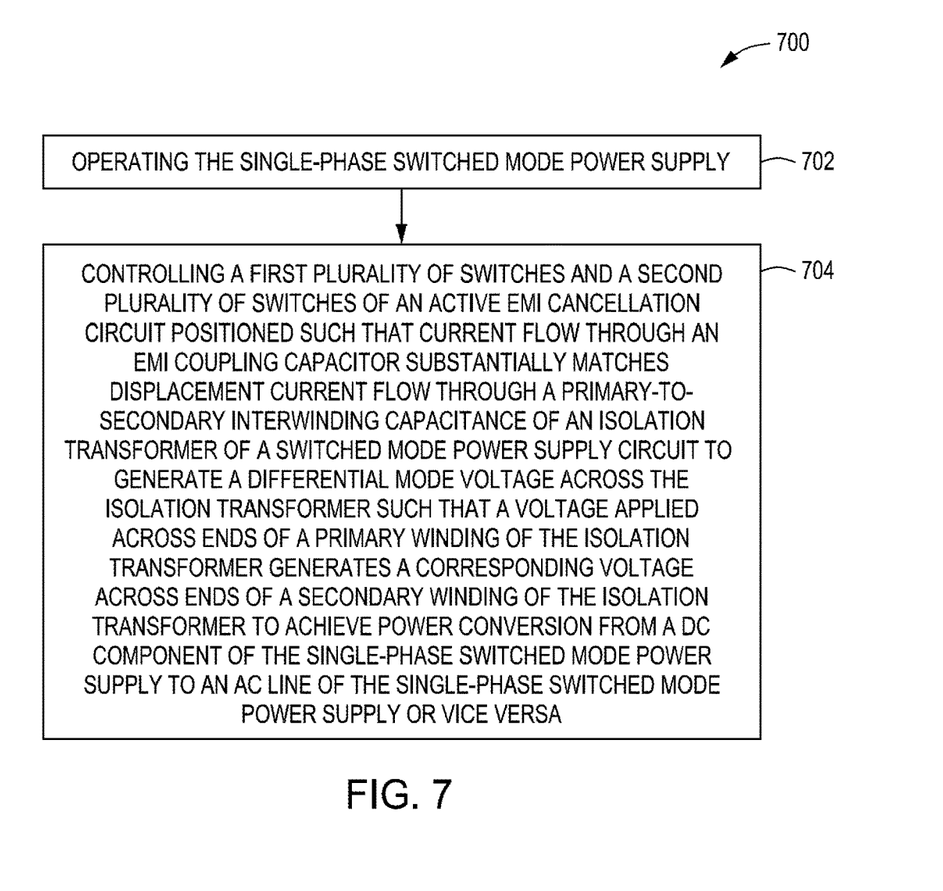
FIG. 7 is a flowchart of a method of controlling a single-phase switched mode power supply in accordance with embodiments of the present disclosure.

FIG. 7 is a flowchart of a method 700 of controlling a single-phase switched mode power supply in accordance with embodiments of the present disclosure.

For example, at 702, the method 700 comprises operating the single-phase switched mode power supply. For example, under the control of the controller 140, the single-phase switched mode power supply can be operated.

Next, at 704, the method 700 comprises controlling a first plurality of switches and a second plurality of switches of an active EMI cancellation circuit positioned such that current flow through an EMI coupling capacitor substantially matches displacement current flow through a primary-to-secondary interwinding capacitance of an isolation transformer of a switched mode power supply circuit to generate a differential mode voltage across the isolation transformer such that a voltage applied across ends of a primary winding of the isolation transformer generates a corresponding voltage across ends of a secondary winding of the isolation transformer to achieve power conversion from a DC component of the single-phase switched mode power supply to an AC line of the single-phase switched mode power supply or vice versa. For example, as noted above with respect to FIGS. 3A-3H, the controller 140 can control one or more of the switches 106 (or switches 128) so that the EMI coupling capacitor 204 can be selected to have a value (nominally) equal to the primary-to-secondary interwinding capacitance Cy of the isolation transformer 124, such that the current that flows through the EMI coupling capacitor 204 will exactly match the displacement current that flows through the primary-to-secondary interwinding capacitance Cy of the isolation transformer 124. The matching of the currents will completely cancel out the transformer displacement current and, thereby, eliminate the need for this displacement current to be filtered out by an EMC filter.

The multiple examples described herein have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the disclosure presented herein. The disclosure is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

The foregoing description of embodiments of the disclosure comprises a number of elements, devices, circuits and/or assemblies that perform various functions as described. These elements, devices, circuits, and/or assemblies are exemplary implementations of means for performing their respectively described functions.

While the foregoing is directed to embodiments of the present disclosure, other and further embodiments of the disclosure may be devised without departing from the basic scope thereof, and the scope thereof is determined by the claims that follow.

The invention claimed is:

1. An apparatus for active EMI cancellation in a switch mode power supply, comprising:
    an active EMI cancellation circuit coupled to a switch mode power supply circuit comprising an isolation transformer, wherein the active EMI cancellation circuit is positioned such that current flow through an EMI coupling capacitor substantially matches displacement current flow through a primary-to-secondary interwinding capacitance of the isolation transformer.

2. The apparatus of claim 1, wherein the active EMI cancellation circuit further comprises a primary autotransformer, a secondary autotransformer, and a blocking capacitor.

3. The apparatus of claim 2, wherein a first terminal of the primary autotransformer is coupled to a first terminal of the primary winding of the isolation transformer, wherein a center tap of the primary autotransformer is coupled to a second terminal of the primary winding of the isolation transformer, and wherein a second terminal of the primary autotransformer is coupled to a first terminal of the secondary autotransformer.

4. The apparatus of claim 2, wherein a first terminal of the blocking capacitor is coupled to an input bridge of the switch mode power supply circuit, wherein a second terminal of the blocking capacitor is coupled to a center tap of the secondary autotransformer, wherein a second terminal of the secondary autotransformer is coupled to a first terminal of the EMI coupling capacitor, and wherein a second terminal of the EMI coupling capacitor is coupled to the secondary winding of the isolation transformer.

5. The apparatus of claim 2, wherein a number of turns of the primary autotransformer winding substantially matches a primary-to-secondary turns ratio for the isolation transformer.

6. The apparatus of claim 1, wherein the active EMI cancellation circuit further comprises a single 3-limb transformer.

7. The apparatus of claim 6, wherein the single 3-limb transformer comprises a core having a left side connected to a blocking capacitor of the active EMI cancellation circuit and a right side connected to the EMI coupling capacitor.

8. The apparatus of claim 1, wherein the EMI coupling capacitor has a value nominally equal to a value of the primary-to-secondary interwinding capacitance of the isolation transformer.

9. The apparatus of claim 1, wherein a common mode voltage generated across the primary-to-secondary of the isolation transformer is equal and opposite to a voltage generated across the EMI coupling capacitor.

10. A single-phase switched mode power supply, comprising:
    a DC side comprising a first plurality of switches and a DC component;
    an AC side comprising a second plurality of switches and connected to an AC line;
    an active EMI cancellation circuit coupled to a switched mode power supply circuit comprising an isolation transformer, wherein the active EMI cancellation circuit is positioned such that current flow through an EMI coupling capacitor substantially matches displacement current flow through a primary-to-secondary interwinding capacitance of the isolation transformer; and a controller coupled to the active EMI cancellation for controlling operation of the first plurality of switches and the second plurality of switches to generate a differential mode voltage across the isolation transformer such that a voltage applied across ends of a primary winding of the isolation transformer generates a corresponding voltage across ends of a secondary winding of the isolation transformer to achieve power conversion from the DC component to the AC line or vice versa.

11. The single-phase switched mode power supply of claim 10 wherein the active EMI cancellation circuit further comprises a primary autotransformer, a secondary autotransformer, and a blocking capacitor.

12. The single-phase switched mode power supply of claim 11, wherein a first terminal of the primary autotransformer is coupled to a first terminal of the primary winding of the isolation transformer, wherein a center tap of the primary autotransformer is coupled to a second terminal of the primary winding of the isolation transformer, and wherein a second terminal of the primary autotransformer is coupled to a first terminal of the secondary autotransformer.

13. The single-phase switched mode power supply of claim 11, wherein a first terminal of the blocking capacitor is coupled to an input bridge of the switched mode power supply circuit, wherein a second terminal of the blocking capacitor is coupled to a center tap of the secondary autotransformer, wherein a second terminal of the secondary autotransformer is coupled to a first terminal of the EMI coupling capacitor, and wherein a second terminal of the EMI coupling capacitor is coupled to the secondary winding of the isolation transformer.

14. The single-phase switched mode power supply of claim 11, wherein a number of turns of the primary autotransformer winding substantially matches a primary-to-secondary turns ratio for the isolation transformer.

15. The single-phase switched mode power supply of claim 10, wherein the active EMI cancellation circuit further comprises a single 3-limb transformer.

16. The single-phase switched mode power supply of claim 15, wherein the single 3-limb transformer comprises a core having a left side connected to a blocking capacitor of the active EMI cancellation circuit and a right side connected to the EMI coupling capacitor.

17. The single-phase switched mode power supply of claim 10, wherein the EMI coupling capacitor has a value nominally equal to a value of the primary-to-secondary interwinding capacitance of the isolation transformer.

18. The single-phase switched mode power supply of claim 10, wherein a common mode voltage generated across the primary-to-secondary of the isolation transformer is equal and opposite to a voltage generated across the EMI coupling capacitor.

19. A method of controlling a single-phase switched mode power supply, comprising:

operating the single-phase switched mode power supply; and controlling a first plurality of switches and a second plurality of switches of an active EMI cancellation circuit positioned such that current flow through an EMI coupling capacitor substantially matches displacement current flow through a primary-to-secondary interwinding capacitance of an isolation transformer of a switched mode power supply circuit to generate a differential mode voltage across the isolation transformer such that a voltage applied across ends of a primary winding of the isolation transformer generates a corresponding voltage across ends of a secondary winding of the isolation transformer to achieve power conversion from a DC component of the single-phase switched mode power supply to an AC line of the single-phase switched mode power supply or vice versa.

20. The method of claim 19, wherein the active EMI cancellation circuit further comprises at least one of a primary autotransformer, a secondary autotransformer, and a blocking capacitor or a single 3-limb transformer.

* * * * *